United States Patent
Muniswamy Reddy et al.

(10) Patent No.: US 10,747,739 B1
(45) Date of Patent: Aug. 18, 2020

(54) IMPLICIT CHECKPOINT FOR GENERATING A SECONDARY INDEX OF A TABLE

(71) Applicant: Amazon Technologies, Inc., Seattle, WA (US)

(72) Inventors: Kiran Kumar Muniswamy Reddy, Sammamish, WA (US); Xianglong Huang, Bellevue, WA (US); Pejus Manoj Das, Shoreline, WA (US); Wei Xiao, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 685 days.

(21) Appl. No.: 14/859,055

(22) Filed: Sep. 18, 2015

(51) Int. Cl.
G06F 16/22 (2019.01)
G06F 16/28 (2019.01)
G06F 16/23 (2019.01)

(52) U.S. Cl.
CPC .......... G06F 16/2228 (2019.01); G06F 16/23 (2019.01); G06F 16/282 (2019.01)

(58) Field of Classification Search
CPC .......... G06F 17/30215; G06F 17/3002; G06F 17/30575; G06F 17/30578; G06F 17/30159; G06F 17/30584; G06F 17/30336; G06F 17/30194; G06F 17/30312; G06F 17/3048; G06F 17/30557; G06F 17/30911; G06F 17/30581; G06F 17/30286; G06F 17/30321; G06F 17/30097; G06F 17/30176; G06F 17/30619; G06F 17/30162; G06F 17/30203; G06F 17/30545; G06F 3/065; G06F 16/2358; G06F 16/27; G06F 16/22; G06F 16/2228; G06F 16/284; G06F 16/2282; G06F 16/2322; G06F 16/2379; G06F 16/316; G06F 16/41; G06F 16/81; G06F 16/228; G06F 16/23; G06F 16/282
USPC .................. 707/E17.002, E17.005, 623, 741, 707/E17.044, 640, E17.083, E17.123, 707/654, 711, 999.102, 705, E17.01,
(Continued)

(56) References Cited

U.S. PATENT DOCUMENTS 5,548,770 A * 8/1996 Bridges ............. G06F 16/24532
7,020,648 B2 * 3/2006 Challapalli ............. G06F 16/20
(Continued)

OTHER PUBLICATIONS

U.S. Appl. No. 14/859,069, filed Sep. 18, 2015, Kiran Kumar Muniswamy Reddy et al.
(Continued)

*Primary Examiner* — Alford W Kindred
*Assistant Examiner* — Cecile H Vo
(74) *Attorney, Agent, or Firm* — Robert C. Kowert; Kowert, Hood, Munyon, Rankin & Goetzel, P.C.

(57) ABSTRACT

A data storage system may implement implicit checkpoint for generating a secondary of a table. Indexing updates may be replicated and maintained across a replica group storing a table for a data store. Upon detection of a restart event for generating a secondary index, a replica in the replica group may evaluate the indexing updates to determine an index creation restart point according to an order for indexing the table. The generation of the secondary index may be resumed at the index creation restart point. In this way, secondary index generation may continue whether or not a previously indexing replica in the replica group, such as a master replica, is available to continue generating the secondary index.

20 Claims, 9 Drawing Sheets

(58) Field of Classification Search
USPC .......... 707/E17.014, 624, 999.001, E17.054, 707/E17.107, 609, 625, 696, 999.01, 713, 707/714, 722, 736, 758, 610, 679, 740, 707/744; 714/752, 702; 711/162
See application file for complete search history.

(56) References Cited

U.S. PATENT DOCUMENTS

| | | | | |
|---|---|---|---|---|
| 8,504,691 | B1* | 8/2013 | Tobler | H04L 67/02 370/229 |
| 2005/0193245 | A1* | 9/2005 | Hayden | G06F 11/2069 714/13 |
| 2006/0015490 | A1* | 1/2006 | Denuit | G06F 16/24526 |
| 2007/0239769 | A1* | 10/2007 | Fazal | G06F 16/248 |
| 2012/0330954 | A1* | 12/2012 | Sivasubramanian | H04L 67/02 707/737 |
| 2013/0110848 | A1* | 5/2013 | Svendsen | G06F 16/435 707/748 |
| 2014/0196048 | A1* | 7/2014 | Mathur | G06F 9/485 718/104 |
| 2014/0279855 | A1 | 9/2014 | Tan et al. | |

OTHER PUBLICATIONS

"Global Secondary Indexes—Amazon DynamoDB", Retrieved from URL: http://docs.aws.amazon.com/amazondynamodb/latest/developerguide/GSI.html on Jul. 2, 2016, pp. 1-9.
U.S. Appl. No. 14/859,072, filed Sep. 18, 2015, Kiran Kumar Muniswamy Reddy, et al.
U.S. Appl. No. 14/859,059, filed Sep. 18, 2015, Kiran Kumar Muniswamy Reddy, et al.
U.S. Appl. No. 14/859,075, filed Sep. 18, 2015, Aanchal Gupta, et al.
U.S. Appl. No. 14/859,062, filed Sep. 18, 2015, Wei Xiao, et al.
U.S. Appl. No. 14/858,360, filed Sep. 18, 2015, Aanchal Gupta, et al.

\* cited by examiner

IMPLICIT CHECKPOINT FOR GENERATING A SECONDARY INDEX OF A TABLE

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may receive a high volume of request traffic to access data and to manage the storage of data. Different mechanisms for structuring, arranging, or otherwise making data available may be implemented in order to service requests. Secondary indexes, for example, provide an alternative arrangement of data stored in a database system which may be accessed more efficiently for certain information requests. Data indexed in one fashion at a database may be indexed in a different fashion at a secondary index. Creating secondary indexes, however, can be challenging. Secondary index creation can be resource intensive and may create opportunities for inconsistency between data stored in the database table and the secondary index.

Figure 1:
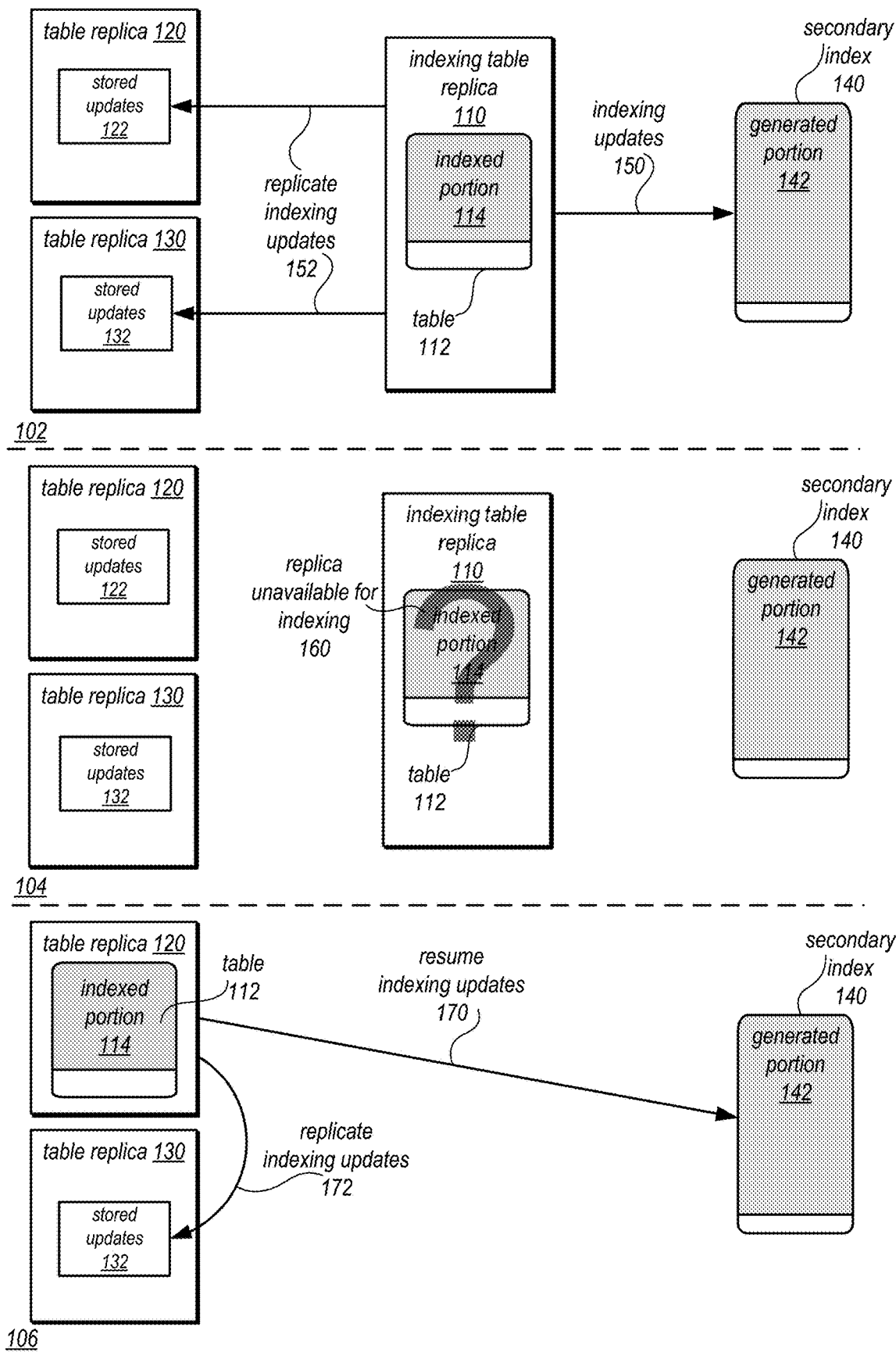
FIG. 1 is a series of logical block diagrams illustrating a failover technique that utilizes an implicit checkpoint for generating a secondary index for a table, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement implicit checkpoint for generating a secondary index for a table. Data stores offer accessible and scalable storage to one or more multiple different clients. Tables of items (which may include one or more data values or attributes) may be stored, managed and accessed at a data store. Different types of data stores may exist. Relational data stores may be implemented which organize and maintain data according to a relational scheme (e.g., a common set of data fields for an entry in a table). Non-relational data stores may be implemented which organize and maintain data according to a key value pair which uniquely identifies an item in the table. Generally, this allows for fast throughput to update data in items or store new items. However, in some scenarios, locating items that have particular attributes may be resource intensive. For instance, identifying items with a particular attribute value that is within a range of values would likely instigate a scan of an entire table even though the range of may be only a small portion of possible values for the particular attribute or the particular attribute may not exist for some items in the table.

Secondary indexes may be created for a table in a relational or a non-relational data store in order to provide an alternative access schema for items (e.g., in addition to a unique key value pair in the case of a non-relational data store). For instance, a table that includes items for registered users may include a user identifier, which is unique and primary key for the item, along with a first name attribute, last name attribute, gender attribute, and age attribute. A secondary index may be generated for the table which can index items according to other values than the key value pair, such as gender and age. For example, the secondary index may be generated so that all items with male attribute values are stored together according to age attribute value order. Similarly, all items with female attribute values are stored together according to age attribute value order. In this way, an access request for data that specifies a particular range of ages for males or females may be quickly obtained without performing a scan of the entire table of items, as noted above, (which may be very costly in the case of a non-relational data store). Other attribute values may also be included in the secondary index, such as first and last name attribute values. In at least some embodiments, the key value pair that uniquely identifies the item may be included in the secondary index (e.g., the user identifier). Once created, a secondary index can be updated with any changes made to the original table.

While secondary indexes can provide useful alternatives access capabilities to data, creating the secondary index may be a long running operation. Therefore the chance that an error or failure may lead to the restarting of a creation process for generating the secondary index is not insignificant. Typically, checkpoint operations are done (especially in distributed environments) to explicitly mark the progress of an operation. However, check point operations may only provide a progress marker as of a specific time in which the explicit checkpoint operation was performed. Implicit checkpoint may be implement so that progress of a secondary index creation operation may be accurately discoverable across distributed resources storing a table. Moreover, in distributed storage environments, implicit checkpoint may remove the need to implement different consistency mechanism to ensure that the checkpoint at each node in the distributed system is consistent.

FIG. 1 is a series of logical block diagrams illustrating a failover technique that utilizes an implicit checkpoint for generating a secondary index for a table, according to some embodiments. As illustrated in scene 102, a table 112 is maintained in different replicas 110, 120 and 130. A secondary index 140 is being created for table 112. Indexing table replica 110 is scanning portions of table 112 and generating indexing updates 150 to be sent and applied at secondary index 140. In addition to sending indexing updates 150, indexing table partition 110 replicates indexing updates 152 to table replicas 120 and 130 to be respectively maintained in stored updates 122 and 132.

In scene 104, indexing table replica 110 is unavailable for indexing 160 (e.g., due to a failure or restart of server or other host for indexing table replica 110 or a network partition that prevents indexing replica 110 from communicating with table replicas 120, 130 and/or secondary index 140). Yet, indexing of table 112 is not complete (as only a portion 114 of secondary index 140 is generated). In order to prevent wasted resources as a result of re-indexing portions of table 112 that have already been indexed, a table replica 120 that also hosts table 112 (not illustrated in scenes 102 and 104) may determine an index creation restart point that identifies remaining portions of table 112 to be indexed.

To discover the index creation restart point, table replica 120 may evaluate items in stored updates according to an order for indexing table 112. For instance, table replica 120 may determine that no items with values less than "423778" have been included in the index according to the stored updates. If the order of indexing is in decreasing numerical order, then table replica 120 may determine that portions with items less than 423778 remain to be indexed, and may identify 423778 as an index creation restart point for continuing with generating the index.

As illustrated in scene 106, once table replica 120 identifies the index creation restart point, table replica 120 may resume sending indexing updates 170 to secondary index 140 and replicate the indexing updates 172 to table replica 130. Please note that previous descriptions are not intended to be limiting, but are merely provided as logical examples of implicit checkpoint for generating a secondary index for a table. Various other replicas may perform the described restart techniques using the implicit checkpoint to restart generation of a secondary index. For example, table replica 130 may perform the evaluation of stored updates 132 to identify the index creation restart point and resume creation of the secondary index 140. Or, indexing table replica 110 may come back online and evaluate a local copy of stored indexing updates (not illustrated) to determine the index creation restart point.

This specification begins with a general description of storage service implementing a network-based data store that may also implement implicit checkpoint for generating a secondary index. Then various examples of the storage service are discussed, including different components/modules, or arrangements of components/module, that may be employed as part of implementing the storage service. A number of different methods and techniques to implement implicit checkpoint for generating a secondary index are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
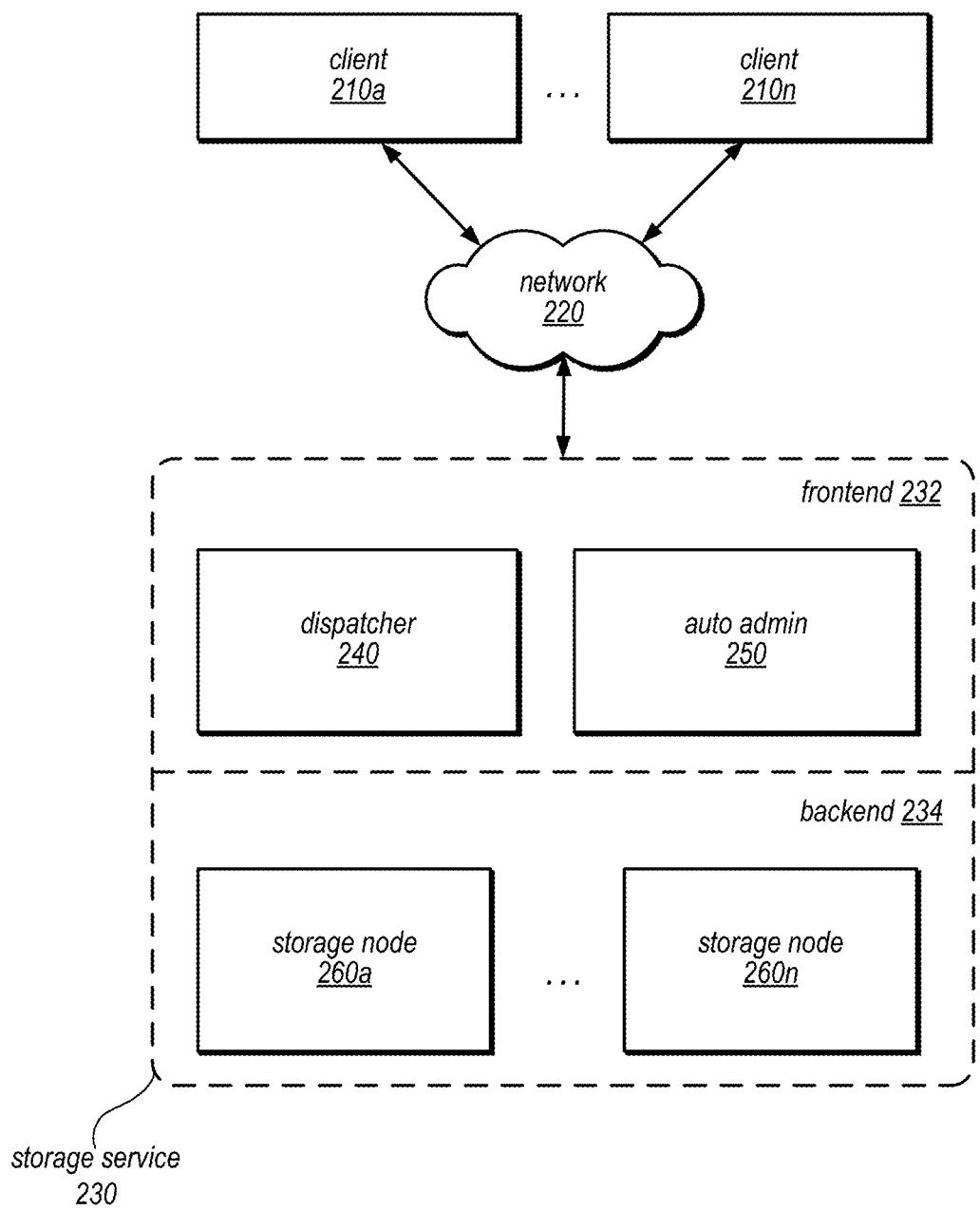
FIG. 2 is a block diagram illustrating a storage service that implements an implicit checkpoint for generating a secondary index for an online table, according to some embodiments.

FIG. 2 is a block diagram illustrating a storage service that implements an implicit checkpoint for generating a secondary index for an online table, according to some embodiments. It is noted that where one or more instances of a given component may exist, reference to that component herein below may be made in either the singular or the plural. However, usage of either form is not intended to preclude the other. In various embodiments, the components illustrated in FIGS. 2-4 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as computing system 1000 in FIG. 9 described below. In various embodiments, the functionality of a given storage service system component may be implemented by a particular computing node or may be distributed across several computing nodes. In some embodiments, a given computing node may implement the functionality of more than one storage service system component.

Generally speaking, clients 210a-210n may encompass any type of client configurable to submit web services requests to network-based storage service 230 via network 220. For example, a given storage service client 210 may include a suitable version of a web browser, or a plug-in module or other type of code module configured to execute as an extension to or within an execution environment provided by a web browser to provide database or data storage service clients (e.g., client applications, users, and/or subscribers) access to the services provided by network-based services platform 230. Alternatively, a storage service client 210 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 210 may be an application configured to interact directly with network-based storage service 230. In various embodiments, storage service client 210 may be configured to generate web services requests according to a Representational State Transfer (REST)-style web services architecture, a document- or message-based web services architecture, or another suitable web services architecture.

In some embodiments, storage service client 210 may be configured to provide access to network-based storage service 230 to other applications in a manner that is transparent to those applications. For example, storage service client 210 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to network-based storage service 230 may be coordinated by storage service client 210 and the operating system or file system on behalf of applications executing within the operating system environment.

Storage service clients 210 may convey web services requests to and receive responses from network-based storage service 230 via network 220. In various embodiments, network 220 may encompass any suitable combination of networking hardware and protocols necessary to establish web-based communications between clients 210 and network-based storage service 230. For example, network 220 may generally encompass the various telecommunications networks and service providers that collectively implement the Internet. Network 220 may also include private networks such as local area networks (LANs) or wide area networks (WANs) as well as public or private wireless networks. For example, both a given client 210 and network-based storage service 230 may be respectively provisioned within enterprises having their own internal networks. In such an embodiment, network 220 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based storage service 230. It is noted that in some embodiments, storage service clients 210 may communicate with network-based storage service 230 using a private network rather than the public Internet. For example, clients 210 may be provisioned within the same enterprise as the data storage service (and/or the underlying system) described herein. In such a case, clients 210 may communicate with network-based storage service 230 entirely through a private network 220 (e.g., a LAN or WAN that may use Internet-based communication protocols but which is not publicly accessible).

Generally speaking, network-based storage service 230 may be configured to implement one or more service endpoints configured to receive and process web services requests, such as requests to access tables maintained on behalf of clients/users by a database service or a data storage service, and/or the items and attributes stored in those tables. For example, network-based storage service 230 may include hardware and/or software configured to implement various service endpoints and to properly receive and process HTTP-based web services requests directed to those endpoints. In one embodiment, network-based storage service 230 may be implemented as a server system configured to receive web services requests from clients 210 and to forward them to various components that collectively implement a data storage system for processing. In other embodiments, network-based storage service 230 may be configured as a number of distinct systems (e.g., in a cluster topology) implementing load balancing and other request management features configured to dynamically manage large-scale web services request processing loads.

As illustrated in FIG. 3, network-based storage service 330 may include a dispatcher 340 (which may be configured to receive, authenticate, parse, throttle and/or dispatch service requests, among other things), one or more administrative components, or auto admin instances, 350 (which may be configured to provide a variety of visibility and/or control functions, as described in more detail herein) which may be implemented as part of frontend 232. Storage service 230 may also implement a plurality of storage node instances (shown as 360a-360n), each of which may maintain and manage one or more tables on behalf of clients/users or on behalf of the data storage service (and its underlying system) itself, as part of backend 234. Some of the functionality provided by each of these types of components is described in more detail herein, according to various embodiments. Note that in some embodiments, network-based storage service 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 2. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, network-based storage service 230 may be configured to support different types of web services requests. For example, in some embodiments, network-based storage service 230 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments network-based storage service 230 may implement various client management features. For example, service 230 may coordinate the metering and accounting of client usage of web services, including storage resources, such as by tracking the identities of requesting clients 210, the number and/or frequency of client requests, the size of tables and/or items stored or retrieved on behalf of clients 210, overall storage bandwidth used by clients 210, class of storage requested by clients 210, and/or any other measurable client usage parameter. Network-based storage service 230 may also implement financial accounting and billing systems, or may maintain a database of usage data that may be queried and processed by external systems for reporting and billing of client usage activity. In some embodiments, network-based storage service 230 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, scan (e.g., list items) over the whole table, optionally filtering the items returned, and create one or more secondary indexes global to the whole table which may be used to perform different queries efficiently over particular attributes in the table that are used to create the secondary index. The amount of work required to satisfy service requests that specify these operations may vary depending on the particular operation specified and/or the amount of data that is accessed and/or transferred between the storage system and the client in order to satisfy the request. Thus, storage service 230 may identify some requests for synchronous processing while other requests may be identified for asynchronous processing.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In various embodiments, a database service or data storage service may be implemented on one or more computing nodes that are configured to perform the functionality described herein. In some embodiments, the service may be implemented by a network-based storage service (such as network-based storage service 230 in FIG. 2) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other network-based services or applications, in some embodiments).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 3A:
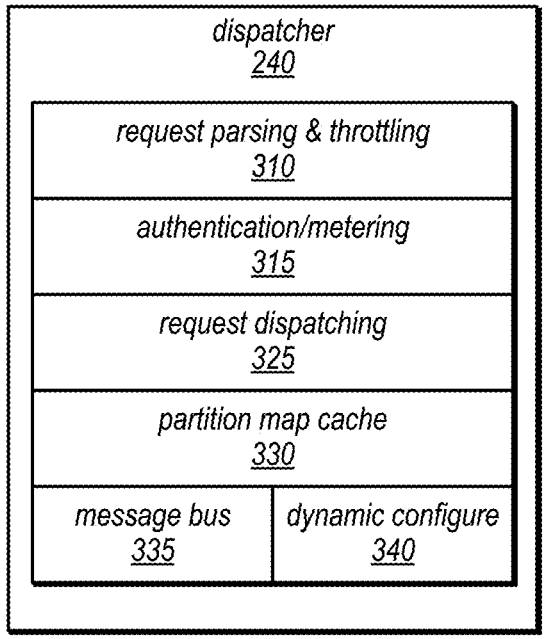
FIGS. 3A-3C are block diagrams illustrating various components of a storage service, according to some embodiments.
Figure 3B:
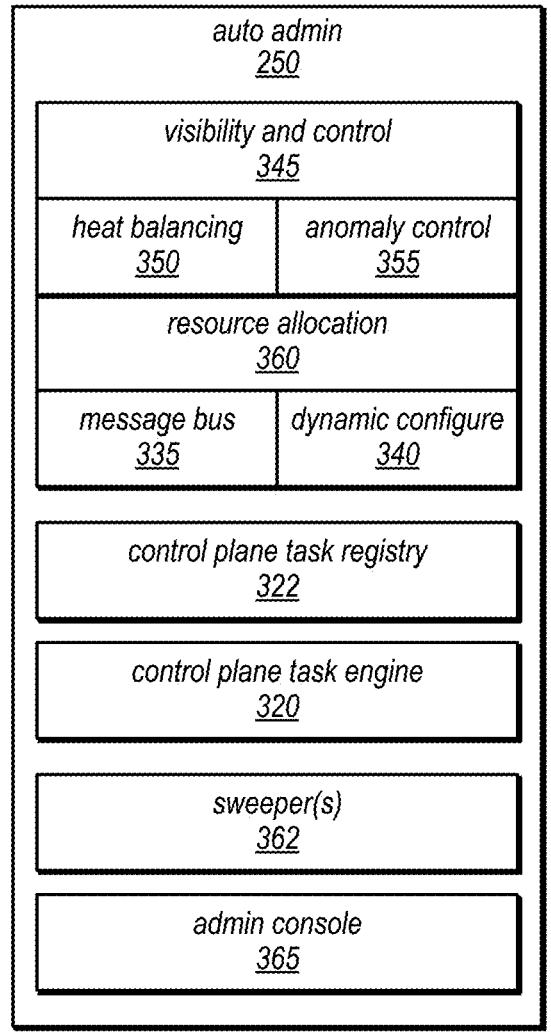
Figure 3C:
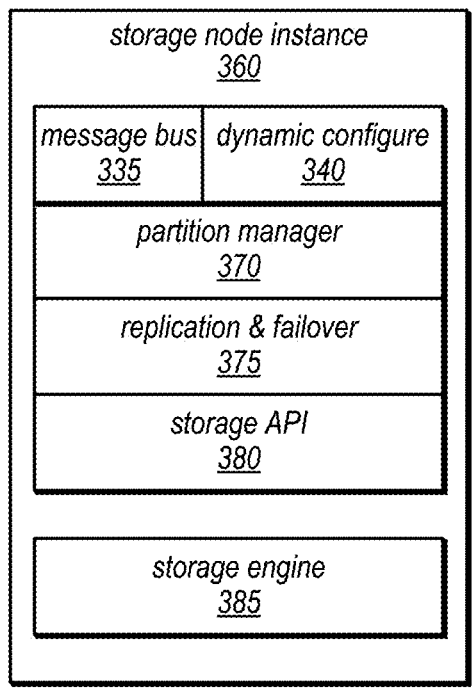

FIGS. 3A-3C illustrate various elements or modules that may be included in each of the types of components of network-based storage service 230, according to one embodiment. As illustrated in FIG. 3A, dispatcher 240 may include one or more modules configured to perform parsing and/or throttling of service requests (shown as 310), authentication and/or metering of service requests (shown as 315), dispatching service requests (shown as 325), and/or maintaining a partition map cache (shown as 330). In addition to these component-specific modules, dispatcher 240 may include components that are common to multiple types of computing nodes that collectively implement Web services platform 330, such as a message bus (shown as 335) and/or a dynamic configuration module (shown as 340). In other embodiments, more, fewer, or different elements may be included in dispatcher 240, and any of the elements illustrated as being included in dispatcher 240 may be included in another component of network-based storage service 230 or in a component configured to interact with network-based storage service 230 to provide the data storage services described herein.

As illustrated in FIG. 3B, auto admin instance 250 may include one or more modules configured to provide visibility and control to system administrators (shown as 345), or to perform heat balancing (shown as 350), and/or anomaly control (shown as 355), resource allocation (shown as 360). In some embodiments, resource allocation module 360, heat balancing module 350, anomaly control module 355, control plane event registry 322, control plane task engine 320, and/or sweeper module(s) 362, may be configured to work separately or in combination to perform identifying requests for asynchronous processing and performing asynchronous processing of requests, as described in more detail below. Auto admin instance 250 may also include an admin console 365, through which system administrators may interact with the data storage service (and/or the underlying system). In some embodiments, admin console 365 may be the primary point of visibility and control for the data storage service (e.g., for configuration or reconfiguration by system administrators). For example, admin console 365 may be implemented as a relatively thin client that provides display and control functionally to system administrators and/or other privileged users, and through which system status indicators, metadata, and/or operating parameters may be observed and/or updated.

Auto admin instance 250 may include, in some embodiments control plane task registry 322. Control plane task registry 322 may provide an interface or access to information stored about one or more detected control plane events, such as requests to be processed, at storage service 230. In at least some embodiments, control plane task registry 322 may be implemented to interface with a table or data object that can be changed, updated or written to by other modules of auto admin instance 250, such as sweeper modules 362 or control plane task engine 320. For example, in some embodiments control plane event data may be stored on a database table that is accessible via control plane task registry 322. In at least some embodiments, other service systems, nodes, devices, instances, etc. may send registration messages for detected control plane events, updates, or some other form of request to auto admin instance 250 for storage in task registry 322.

Control plane event registration messages may, in various embodiments, include information about the detected control plane event. For example, control plane event messages may include the event trigger, such as a particular client or module (e.g., sweeper module). Information about the one or more control plane operations to be performed in response to the control plane event, such as the request type or the resources to be utilized (e.g., storage nodes) may be included.

Auto admin instance 250 may also include control plane task engine 320. As noted above, in some embodiments, multiple instances of auto-admin 250 may be implemented with one instance performing the control plane task engine function, and other deputy instances implementing the sweeper(s). However, in some embodiments a single auto-admin instance may be configured to perform both task scheduling and implement the tasks handlers to perform the scheduled control plane event operations.

Control plane task engine 320 may be configured to direct the performance of different types of control plane operations among the nodes, systems, or devices implementing network-based storage service 230. For instance, task engine 320 may be configured to communicate with master nodes of clusters of storage nodes to initiate the performance of various control plane operations, such as moves, splits, update tables, delete tables, create indexes, etc. . . . . Task engine 320 may also be configured to update task registry 322 (or some other table or data structure) with the status, state, or performance information of the tasks currently being performed. For example, for each child operation or subtask of a control plane operation, an update may be sent to update a respective entry in the record of the detected event to which the operation corresponds. Control plane task engine 320 may also provide updates indicating the resources that are currently utilized to perform the control plane operation, such as the particular replica, data, node, system, or device.

In various embodiments, control plane task engine 320 may be configured to perform an update table operation type. An update table operation may change or modify a performance attribute or value for the maintained table. For instance, in some embodiments, tables may have a provisioned throughput performance (e.g., a certain number of IOPS). An update table operation may change the provisioned throughput performance of the table to a different throughput performance. An update table operation may perform various sub-tasks or child operations. Upon completion or initiation of these or various other steps for performing an update table operation, task handler 150 may be configured to send/write updates to control plane event registry 120 for the detected event. An update table event may be triggered externally, for example by a client API request. In at least some embodiments, an update table API request may be identified for asynchronous processing. Alternatively, one or more internal maintenance operations, such as sweeper modules 362 may trigger an update table operation.

In various embodiments, control plane task engine may be configured to perform a secondary index creation operation in response to a client API request. For instance, in some embodiments, attributes of table may be identified for the creation of a new index for the table. Control plane task engine 320 may identify new storage node instance(s) 360 to host the index and direct storage node instance(s) 360 in the performance of scanning, building, and copying of the index to the new storage nodes instance(s) 360. In at least some embodiments, a create secondary index API request may be identified for asynchronous processing.

In addition to these component-specific modules, auto admin instance 250 may also include components that are common to the different types of computing nodes that collectively network-based storage service 230, such as a message bus (shown as 335) and/or a dynamic configuration module (shown as 340). In other embodiments, more, fewer, or different elements may be included in auto admin instance 250, or any of the elements illustrated as being included in auto admin instance 250 may be included in another component of network-based storage service 230 or in a component configured to interact with network-based storage service 230 to provide the data storage services described herein.

As illustrated in FIG. 3C, storage node instance 360 may include one or more modules configured to provide partition management (shown as 370), to implement replication and failover processes (shown as 375), and/or to provide an application programming interface (API) to underlying storage (shown as 380 Various different ones of the control plane operations described above may be performed locally (e.g., on a given storage node instance 360) based, e.g., on one or more measures of the utilization of provisioned resources on the storage devices or logical storage volumes of the storage node instance.

As noted above, different storage nodes may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine 385, which may be configured to maintain (i.e. to store and manage) one or more tables (and associated table data) in storage 380 (which in some embodiments may be a non-relational database) on behalf of one or more clients/users. In addition to these component-specific modules, storage node instance 360 may include components that are common to the different types of computing nodes that collectively implement Network-based storage service 230, such as a message bus (shown as 335) and/or a dynamic configuration module (shown as 340). In other embodiments, more, fewer, or different elements may be included in storage node instance 360, or any of the elements illustrated as being included in storage node instance 360 may be included in another component of network-based storage service 230 or in a component configured to interact with network-based storage service 230 to provide the data storage services described herein.

Note that in some embodiments, it may not be necessary to perform some or all of the throttling, authentication, and/or metering operations that would typically be provided by dispatcher 240 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 250 (e.g., heat balancing and/or resource allocation) may or may not be applied in managing tables in a single-tenant environment. However, other operations illustrated as being performed by auto admin instance 250 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table or to create a secondary index for a table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

Figure 4:
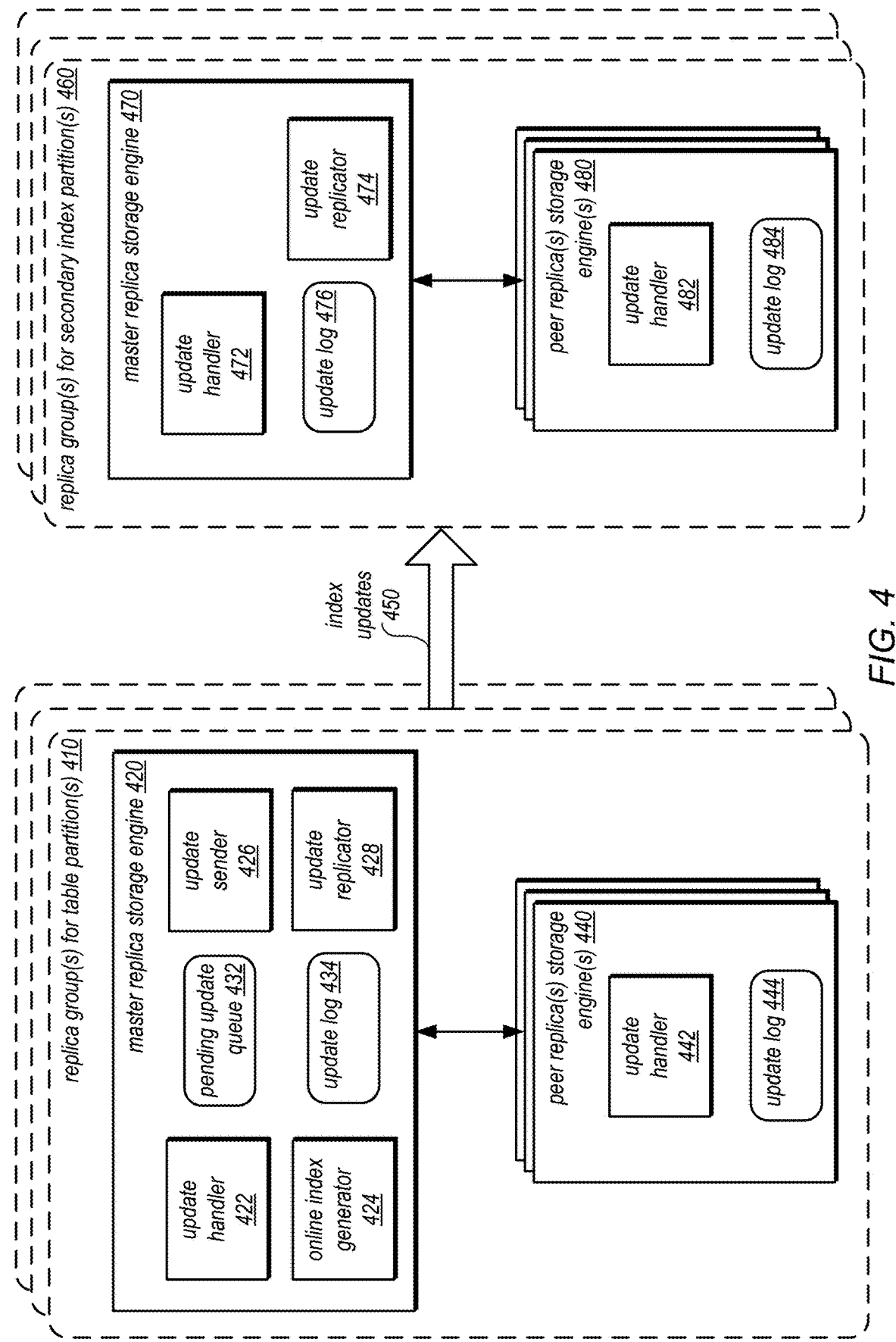
FIG. 4 is a logical block diagram illustrating a replica group for a table partition that replicates index updates in order to provide an implicit checkpoint for secondary index generation, according to some embodiments.

As noted above, a table may be stored in multiple partitions at different storage nodes or hosts. Storage engines at the respective storage hosts, such as storage engine 385 in FIG. 3, may be configured to perform incremental indexing of tables to create a secondary index and may perform implicit checkpoint to make a restart index creation point discoverable across replicas of a partition of the table. FIG. 4 is a logical block diagram illustrating a replica group for a table partition that replicates index updates in order to provide an implicit checkpoint for secondary index generation, according to some embodiments.

Multiple storage nodes may store a partition of a table. As illustrated in FIG. 4, the storage engines for the different storage nodes (420 and 440) may form a replica group for a table partition 410. As the table may be stored in multiple partitions, multiple replica groups 410 may be implemented for a table. In order to create a secondary index for a table, index updates 450 which generate the corresponding entries, items, or other data to be stored in a secondary index may be sent from replica group(s) 410 to replica groups of storage nodes that maintain the one or more partitions 460 of the secondary index. The number and configuration of replica group(s) for secondary index partition(s) 460 may be determined, provisioned, and configured at the time creation of a secondary index is requested. In at least some embodiments, the number of secondary index partitions 460 may be determined according to the provisioned throughput capacity specified for the secondary index.

Replica group(s) 410 may include a master replica, with a storage engine 420 and peer replica(s), with corresponding storage engine(s) 440. Master replica storage engine 420 may implement an update handler 422. Update handler 422 may be implemented to process updates to a table undergoing index creation. Some updates (e.g., to portions of the table that have not been indexed) may be applied by update handler 422 to the table, stored in update log 434, and replicated to peer replica(s) storage engine(s) 420 without further processing, as discussed below with regard to FIG. 8. Update handler 422 may access system metadata that maintains an up-to-date index creation restart point in order to determine which portions of the table remain to be index. For those updates that are determined to update previously indexed portions of the table, update handler 422 places an update in update queue 432 in addition to placing the update in update log 434 and replicating the updates to peer replica storage engine(s) 440 via update replicator 428. If pending update queue 432 has no storage space available for an update, then update handler 422 may deny the update.

In various embodiments, master replica storage engine 420 may implement an online index generator 424 to incrementally index portions of table to create a secondary index for the table according to an order for indexing. Online index generator 414 may identify a portion of the table to scan, identify items, attributes, or other data to include in the secondary index according to an indexing schema specified for the secondary index, and generate updates to include the identified items, attributes, or other data in the secondary index. Online index generator 424 may send indexing updates to peer replica(s) storage engine(s) 440 via update replicator 428, store indexing update(s) in update log 434, and if a quorum of update acknowledgements is received from peer replica(s), as discussed below with regard to FIG. 5, place the indexing update(s) in pending update queue 432.

Storage engines 420 may also implement an update sender 426 which may retrieve updates from update queue 432 and send requests for index update(s) 450 to storage engines for replica groups of secondary index partition(s) 406, such as master replica storage engine 470, which in turn may implement an update handler 472 to process the update requests. Update sender 426 may retrieve and send index update(s) 450 from queue 432 at a specified rate. In at least some embodiments, update handler 472 (or other component for storage engine for the secondary index 470) may update the rate-limit to increase or decrease the rate at which index update(s) 450 are sent to storage engine for secondary index 470. For instance, if the update handler 472 is becoming overwhelmed with updates, update handler 472 may send back-off instructions to update sender 426 so that storage engine 470 is not forced deny index update(s) 450.

Peer replica(s) storage engine(s) 440 (or 480) may implement an update handler 442 to handle update requests replicated to peer replicas. Update handler 442 (or 482) may store log records indicating the updates to the secondary index in update log 444 (or 484). Although not illustrated, in various embodiments peer replicas may implement but not utilize capabilities such as online index generator 424, update replicator 428, update sender 426, or other component to generate a secondary index in the event of a master replica failure. Both master replica storage engine 420 and peer replica(s) storage engine(s) 440 may perform the various techniques to determine an index creation restart point upon detection of a restart event for generating a secondary index, as discussed below with regard to FIG. 6.

Figure 5:
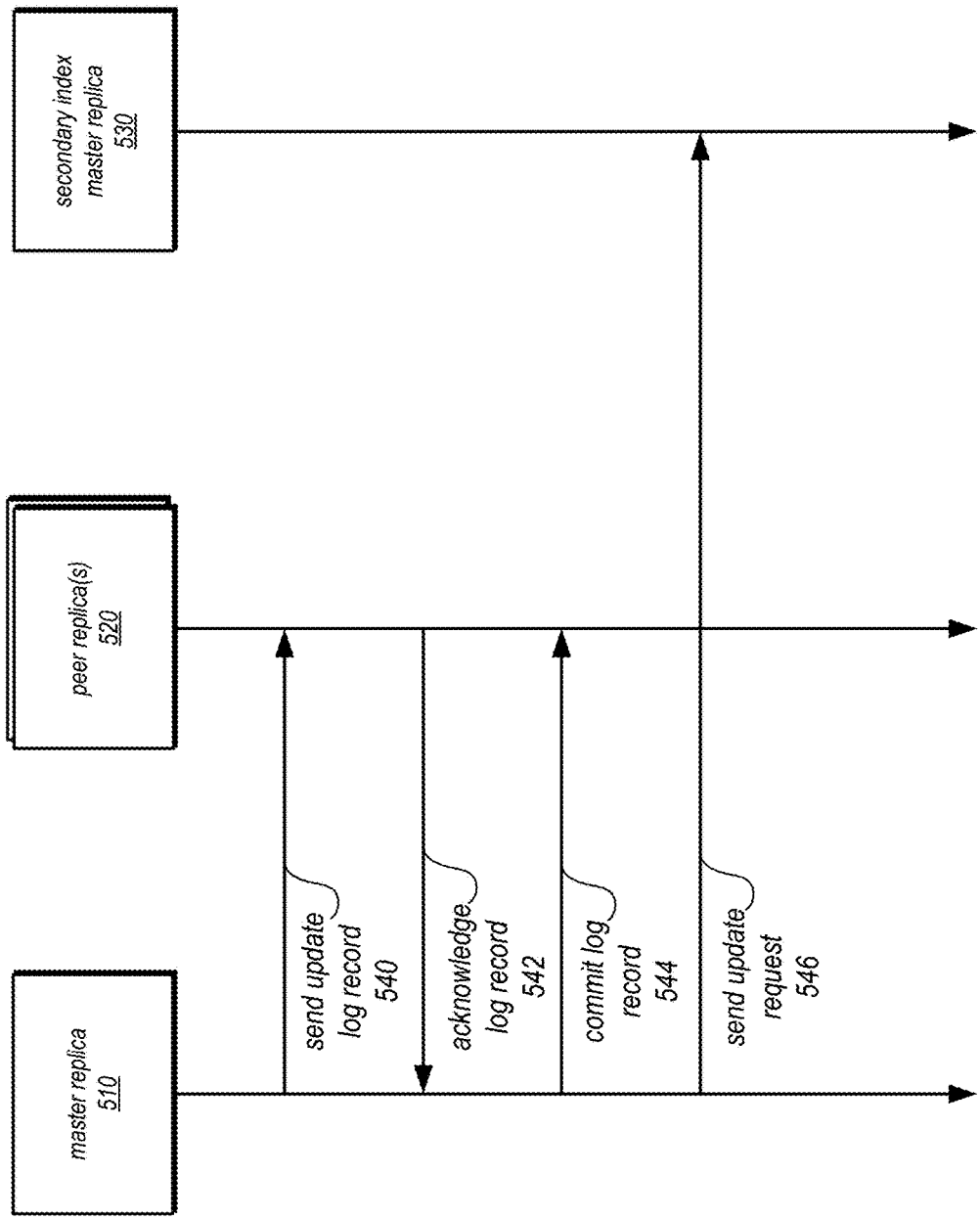
FIG. 5 is a sequence diagram illustrating for replicating a log records for an index update amongst replicas in a replica group and a secondary index master replica, according to some embodiments.

FIG. 5 is a sequence diagram that illustrates replicating log records for an index update amongst replicas in a replica group and a secondary index master replica, according to some embodiments. As master replica 510 generates indexing updates, master replica sends log records indicating the index updates 540 to peer replica(s) 520 in a replica group. Peer replica(s) 520 may receive the updates and store them in an update log maintained at the peer replica(s) 520. Peer replica(s) 520 may then acknowledge the log record 542 to master replica 510.

In various embodiments, a replica group may implement a quorum durability mechanism so that enough replica group members persistently store replicated information before considering that information durable. In the case of replicating log records for index updates, a quorum requirement may be imposed. For example master replica 510 may not consider the index update log record durable until a number of peer replica(s) 520 that meet or exceed the quorum requirement have acknowledged the log record 542. For instance, if the quorum requirement is 3, then at least 3 peer replica(s) 520 must acknowledge the log record before master replica 510 can consider the index durable. If master replica 510 receives enough acknowledgements 542 to satisfy the quorum requirement, then master replica 510 may send instructions to commit the log record 544 at peer replica(s) 520. Master replica 510 may then queue and ultimately send the update request 546 to secondary index master replica 530 for performance at the secondary index.

Figure 6:
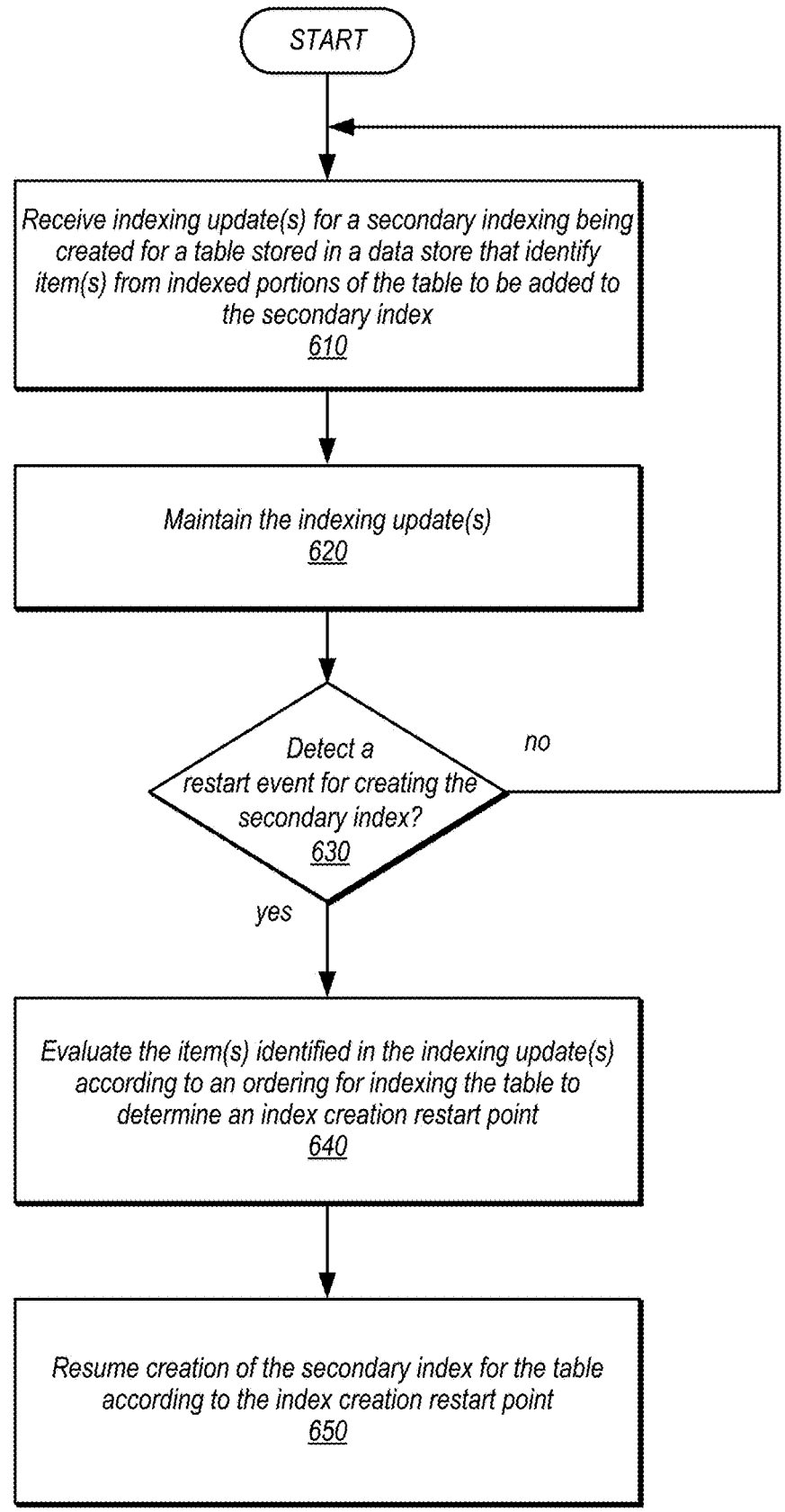
FIG. 6 is a high-level flowchart illustrating various methods and techniques to update a throttle threshold for rate-limiting secondary index creation for a table, according to some embodiments.

The examples of implicit checkpoint for generating a secondary index for a table in FIGS. 2-5 have been given in regard to a non-relational storage service. However, various other types of data stores that may provide generation of a secondary index for a table (e.g., various types of relational data stores) may implement implicit checkpoint for generating a secondary index for a table according to the various techniques described above. Additionally, FIG. 6 is a high-level flowchart illustrating various methods and techniques to implement implicit checkpoint for generating a secondary index for a table, according to some embodiments. These techniques may be implemented using one or storage nodes as described above with regard to FIGS. 2-5, as well as other databases, storage systems, and/or different implementations of a client and/or storage engine, and thus the following discussion is not intended to be limiting as to the other types or configurations of non-relational data stores that may implement the described techniques.

Creation of a secondary index may be initiated as a result of a request to create the secondary index, which may identify an indexing schema for items in the secondary index. For example, the request may indicate two different attributes to be utilized for indexing items in the secondary index as a hash key and a range key, or a single attribute as the hash key. Other attributes to be included in the secondary index in addition to the hash and/or range key may be specified. Creation of the secondary index may be performed while the table is online, available for servicing access requests to data stored in the table, in some embodiments.

Indexing updates may be generated and replicated among members of a replica group for a table. Tables in may be partitioned. Thus, the techniques described in FIG. 5 may be performed among replica groups for multiple different partitions (e.g., at different storage hosts) to create the secondary index for the table. Secondary indexes may also be partitioned. As indicated at 610, the indexing update(s) for a secondary index being created for a table stored in a data store may be received that identify item(s) from indexed portions of the table to be added to the secondary index. The indexing update(s) may indicate portions of the table that have been indexed implicitly by including the update to the secondary index (e.g., an item identifier, such as a primary key, or other unique identifying information that indicates the item or data to be stored in the secondary index).

As indicated at 620, these indexing update(s) may be maintained. Consider the example discussed above with regard to FIG. 4. A log structure may be implemented which stores received indexing update(s) as log records in the log structure. However, other data structures may be implemented for storing indexing updates (e.g., lists, indexes, or buffers), and thus the previous examples are not intended to be limiting.

A restart event for creating the secondary index may be detected, as indicated by the positive exit from 630. A restart event may be an interruption to performing secondary index creation in which the current progress or position of indexing may be lost. For example, a master replica performing secondary index creation may fail (either for a long period of time or a short failure such as power cycle or other reboot), and thus the state of the index creation process may be lost. Network failures, such as network partitions, may also result in restart events as table replicas creating a secondary index may become isolated unable to communicate with a secondary index or peer replicas. Thus, a master replica (or peer replica attempting to become a master replica) or any other replica of the table that wishes to perform indexing may be perform the techniques described in FIG. 6.

An index creation restart point may need to be determined in order to continue indexing of the table, identifying those remaining portions of the table that have not yet been indexed. As indicated at 640, the item(s) identified in the indexing update(s) may be evaluated according to an order for indexing the table to determine the index creation restart point in various embodiments. For example, the order of indexing may be a determinative scheme or heuristic to select different portions of the table to index (without indexing previously indexed portions of the table) until the entire table has been indexed. In at least some embodiments, the order of indexing may be an incremental ordering of primary key values (or other item identifying values). Consider, an order to incrementally index portions of the table alphabetically (e.g., according to a last name value for a last name attribute in items). First, items with last name values that fall within the range of "A" to "D" may be indexed, then "E" to "H" and so on. The identified item(s) in the maintained indexing updates may be evaluated with respect to the order by determining the point in the ordering at which no further items have been indexed. In the alphabetical example given above, if the item(s) of the stored indexing updates have last name values in an alphabetical ordering up to letter "T", then it may be inferred that items in the table past "T" in the ordering have not yet been indexed. "T" may then be identified as the index creation restart point so that items in the table beyond "T" in alphabetic order will be indexed.

Once the index creation restart point is determined, creation of the secondary index for the table may be resumed according to the index creation restart point, as indicated at 650. Remaining portions of the table may be indexed for the table as identified by the index creation restart point. In the above example, incremental indexing of the table may begin starting last name values greater than "T". In some embodiments, authority to resume creation of the secondary index may also need to be obtained prior to resuming creation of the secondary index. For example, in a master replica failover scenario, a peer replica may have to obtain agreement from remaining peer replicas that the peer replica can become the master replica (or perform the steps necessary to force other peer replicas to acknowledge the peer replicas as the master replica).

Figure 7:
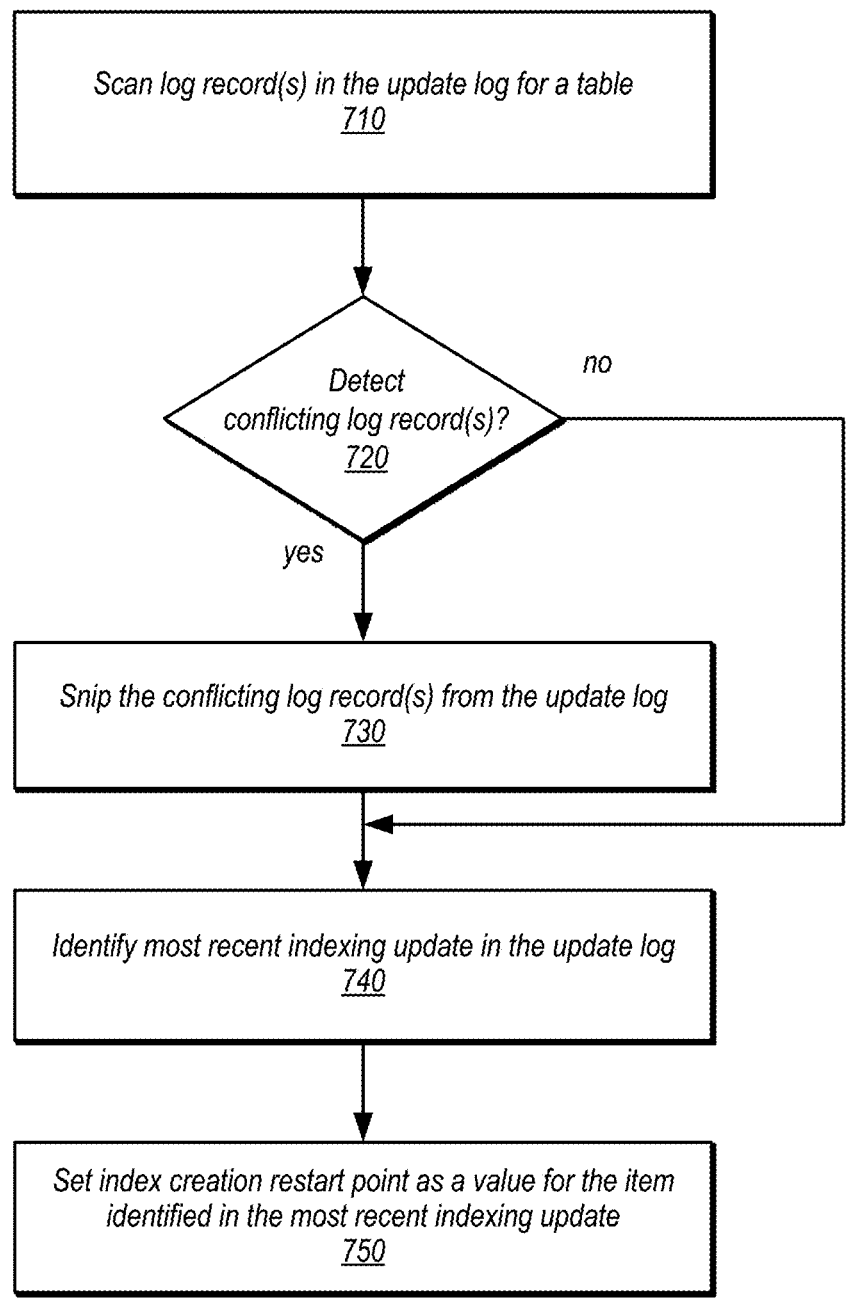
FIG. 7 is a high-level flowchart illustrating various methods and techniques to evaluate index updates to determine an index creation restart point, according to some embodiments.

In at least some embodiments, indexing updates may be maintained as a log record of updates to a table (as discussed above with regard to FIG. 4). In this way, indexing updates may be inherently organized according to the log ordering (e.g., log sequence number (LSN) and efficiently evaluated for determining the index creation restart point. Additionally various other consistency mechanisms may be implemented utilizing information stored in the log. FIG. 7 is a high-level flowchart illustrating various methods and techniques to evaluate index updates to determine an index creation restart point, according to some embodiments.

As indicated at 710, log record(s) in an update log for a table may be scanned, in various embodiments. Log sequence numbers, version numbers, epoch numbers and/or other indicators of log state may be evaluated to determine whether or not conflicting log records are present in the log, as indicated at 720. Conflicting log records may be log records that describe alternative states of the table in the data store which cannot be guaranteed to be consistent. For instance, in a quorum based replication scheme (as described above with regard to FIG. 5), some peer replicas may receive a log record for an update while others may not (e.g., due to network failures, master replica failure, peer replica failures, etc.). Thus, logs stored at the different peer replicas may include different content which may record the table (or secondary index) in a different state. Conflicting log records may be those log records that create the inconsistency between replicas of the table.

Detecting conflicting records may be performed by determining whether the log sequence numbers, version numbers and/or epoch numbers for the log records are consistent. For instance, a peer replica may exchange log records with another peer replica and receive log records with a different version or epoch number. The changed version or epoch number may indicate that membership in the replica group or a change in the master replica has taken place. If a replica also has log records in the log with higher LSNs than the log records with a different version or epoch number from the peer replica, then the two groups of log records may be conflict. Please note that previous example of conflicting log records is provided as an example as is not intended to be limiting as to the many other ways in which conflicting log records for a table may be detected. As indicated at 730, conflicting log records may be snipped from the update log, in some embodiments. For example, one or both of the conflicting log records described above may be deleted (or marked for deletion and ignored for evaluation purposes) in the log.

Once conflicting log records are snipped, or no conflicting log records exist, as indicated by the negative exit from 720, the most recent indexing update may be identified in the update log, as indicated at 740. LSNs or other ordering indicators may be analyzed to identify the log record describing an indexing update with the highest LSN. The update log may include other log records indicating other information (e.g., updates to be applied at the peer replica, state changes for the table, or other information to be communicated and recorded at a peer replica), which may be ignored for purposes of determining the most recent indexing update. As indicated at 750, the index creation restart point may be set as a value for the item or data identified in the most recent indexing update. For instance, log records describing the updates to generate the secondary index may include various information about the data to be included in the secondary index as part of the update. An item or data identifier, such as a unique key value (e.g. a primary key value) may be included in the log record. The item identifier may be stored and accessed when resuming creation of the secondary index as a set starting value when choosing subsequent portions of the table to index according to the order of indexing the table. For example, if the item identifier has value of "54376" for the item to be included in the secondary index, and the order of indexing proceeds in increasing numerical order, then the index creation restart point may be set at 54376 so that items in the table that >54376 will be identified for indexing.

Figure 8:
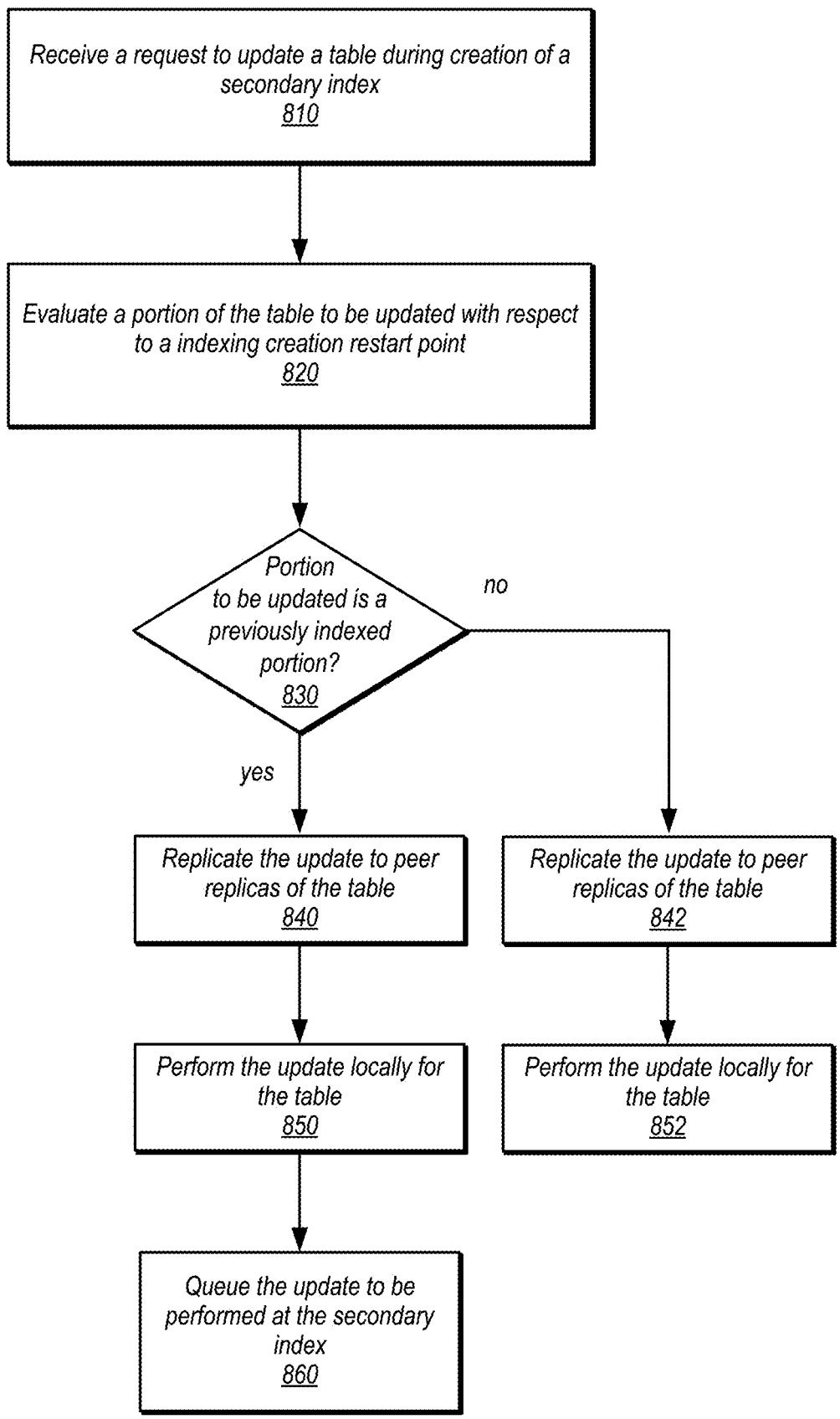
FIG. 8 is a high-level flowchart illustrating various methods and techniques to process update requests for a table during secondary index creation using an index creation restart point, according to some embodiments

As noted earlier, an index creation restart point may act as a progress cursor or other indication of completed indexing for a secondary index being created. Since the table may be online and available for access requests during the creation of the secondary index, the index creation restart point may be used to determine how requests are handled. Update requests, for instance, may be handled differently depending on whether the request updates a portion of the table that has, or has not, been indexed. Alternatively, read requests (or other requests to get data) may be processed irrespective of the status or progress of creating the secondary index. FIG. 8 is a high-level flowchart illustrating various methods and techniques to process update requests for a table during secondary index creation using an index creation restart point, according to some embodiments.

As indicated at 810, a request to update a table during creation of a secondary index for the table may be received, in various embodiments. Update requests may be received via a network-based interface for the data store hosting the table. A network-based interface for the data store may be programmatic (e.g., an API), allowing clients to format requests so as to provide the data store with enough information to process the request. For example, various requests to change, add, remove, or otherwise modify data in the table may be specified according to the API.

Update requests may identify the portion of the table to be updated. For instance, in a key value data store, the request may specify a uniquely identifying key and value in order to identify the data to be updated. This updated portion of the data may be evaluated with respect to an index creation restart point, as indicated at 820, in various embodiments. For instance, the index creation restart point may be stored in table metadata at a partition storage engine (e.g., at a master storage node) when indexing updates are determined to be durable or committed for the table (e.g., when one or multiple peer storage partitions acknowledge the indexing update), updating the index creation restart point as new indexing updates are generated. Thus, when an update request is received, the metadata may be accessed to identify the indexing restart point, acting as a progress cursor in the ordering for indexing the table.

The indexing restart point may provide an indication of those portions of the table already indexed. For example, if the order of indexing performs incremental indexing in increasing alphabetic order for items in the table, then the index creation restart point may be used to divide a set of possible values for the items (e.g., A to Z) into an indexed (or locked for indexing) portion and a portion to be indexed (e.g., index creation restart point="K" such that portions of the table for items "A"<"K" have already been, or are currently being, indexed). If the portion to be updated is not in a previously indexed portion (e.g., update item with a value of "S", which is >"K"), as indicated by the negative exit from 830, then different processing steps may be performed. For example, as illustrated in FIG. 8, the update may be performed solely at the table (without queuing the update to be performed at the secondary index). Instead, the update may be treated as if the secondary index does not existing, leaving the update to be replicated to peer replicas for the table, as indicated at 842, and performed locally for the table (e.g., applied to appropriate storage locations in persistent storage devices connected to a master replica storage node), as indicated at 852.

For those portions to be updated that are in a previously indexed portion e.g., (update item with a value of "D", which is <"K"), additional and/or different processing operations may be performed, as indicated by the positive exit from 830. As illustrated in FIG. 8, for example, the update may be queued as a pending update to be performed at the secondary index, as indicated at 860, so that the secondary index may be updated according to the request. Additionally, as indicated at 840 and 850, the update may also be replicated to peer replica(s) for the table and performed locally for the table. Please note that in some embodiments, currently indexing portions of the database may be locked for access requests. In such scenarios, the received update request may be delayed if the updated portion is locked. Upon release of the lock, the update may be performed (e.g., replicating the update to peer replicas 840 and performing the update at the table 850).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
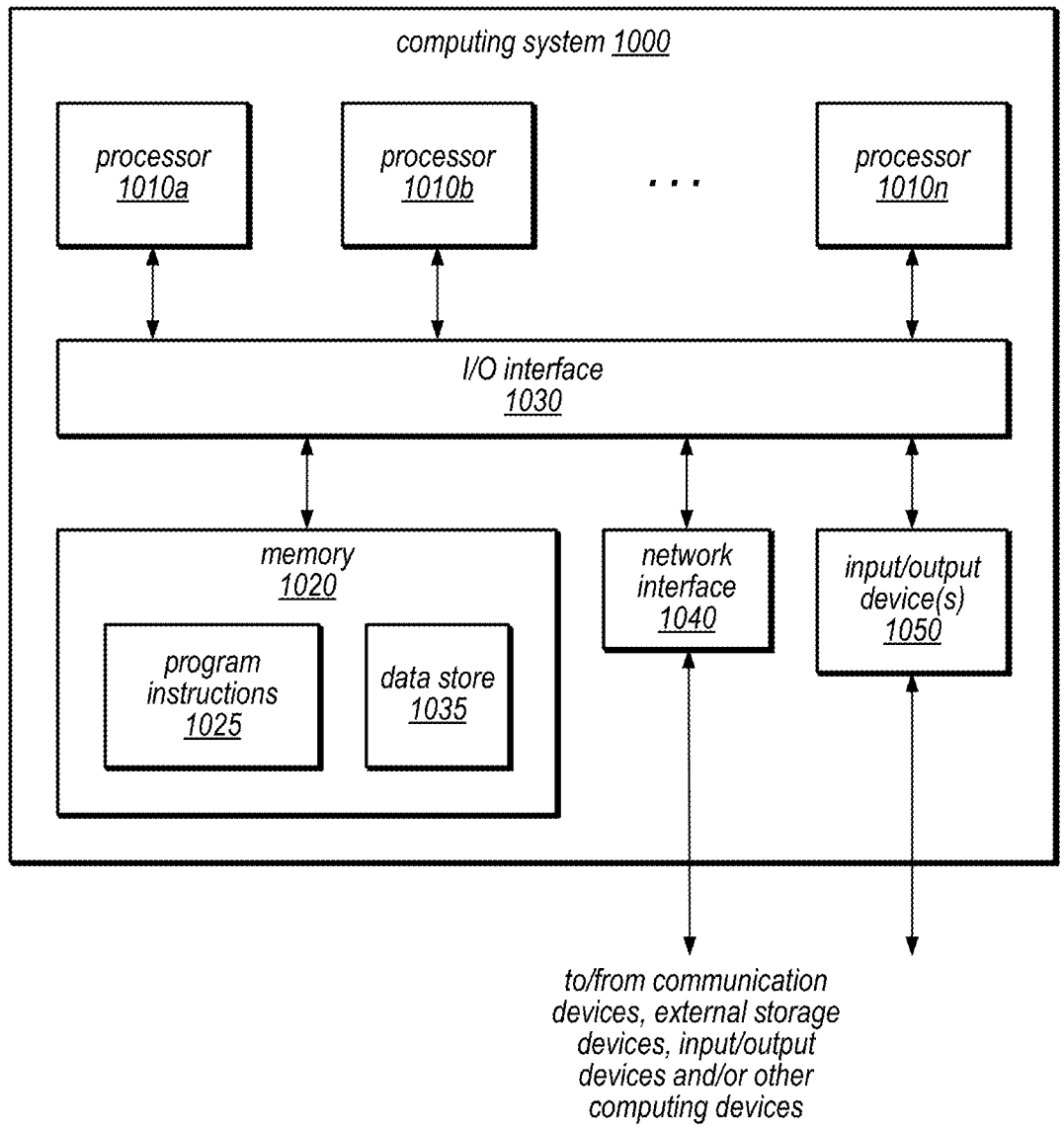
FIG. 9 is a block diagram illustrating an example computing system, according to some embodiments.

Embodiments of implicit checkpoint for generating a secondary index for a table as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various embodiments of the systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  a plurality of computing devices comprising respective processors and a memory to implement a plurality of storage nodes for a data store;
  one of the storage nodes is a master replica for a table stored in the data store and indexed according to a primary schema of a primary index, the master replica configured to:
    generate a plurality of indexing updates as part of creating a secondary index for the table that provides an alternative to the primary schema for accessing the table, wherein the indexing updates identify respective items from indexed portions of the table to be copied and stored together at the secondary index according to the alternative schema;
    send, as part of said creating the secondary index that provides the alternative schema for accessing the table, the indexing updates to one or more peer replicas at other ones of the storage nodes for the table;
  one of the storage nodes is one of the one or more peer replicas configured to:
    upon detection of a restart event for creating the secondary index that provides the alternative schema for accessing the table, wherein the restart event is triggered by an error or failure that interrupts said creating the secondary index:
      scan the respective items of the received indexing updates to determine an index creation restart point with respect to an order for indexing the table, wherein the index creation restart point is determined such that any remaining portions of the table to be indexed are identified with respect to the index creation restart point;
      resume creation of the secondary index that provides the alternative schema for accessing the table according to the index creation restart point; and
      index the identified remaining portions of the table to provide access to the table via the secondary index having the alternative schema.

2. The system of claim 1,
  wherein the one peer replica is further configured to store the indexing updates as log records in a log; and
  wherein, to scan the respective items of the received indexing updates, the one peer replica is configured to:
    identify a most recent indexing update in the log of indexing updates; and
    set the index creation restart point as a value for the respective item indicated in the most recent indexing update.

3. The system of claim 1, wherein during the creation of the secondary index the table is available for servicing one or more access requests.

4. The system of claim 1, wherein the data store is a non-relational storage service, wherein the table is maintained for a client of the non-relational storage service, and wherein creation of the secondary index is performed in response to a request from the client to create the secondary index for the table.

5. A method, comprising:
  performing, by one or more computing devices:
    during creation of a secondary index for a table stored in a data store that provides an alternative to a primary schema of a primary index for accessing the table, maintaining a plurality of indexing updates directed to the secondary index that identify respective items from indexed portions of the table to be copied and stored together at the secondary index according to the alternative schema;
    upon detecting a restart event for the creation of the secondary index that provides the alternative schema for accessing the table, wherein the restart event is triggered by an error or failure the interrupts the creation of the secondary table:
      evaluating the respective items of the plurality of indexing updates according to an order for indexing the table to determine an index creation restart point, wherein the index creation restart point is determined such that any remaining portions of the table to be indexed are identified with respect to the index creation restart point;

resuming creation of the secondary index that provides the alternative schema for accessing the table according to the index creation restart point; and indexing the identified remaining portions of the table to provide access to the table via the secondary index having the alternative schema.

6. The method of claim 5, further comprising:

generating, by a master replica of the table performing the creation of the secondary index, the plurality of indexing updates; and sending, by the master replica of the table, to one or more peer replicas of the table the plurality of indexing updates.

7. The method of claim 5, wherein the plurality of indexing updates are maintained as respective log records in an update log for the table, and wherein evaluating the respective items of the plurality of indexing updates comprises:

scanning the log records of the update log;

identifying a most recent indexing update in the update log; and setting the index creation restart point as a value for the respective item indicated in the most recent indexing update.

8. The method of claim 7, wherein evaluating the respective items of the plurality of indexing updates further comprises:

prior to identifying the most recent indexing update in the update log, snipping one or more conflicting log records from the update log.

9. The method of claim 5, wherein the table is available for servicing accessing requests during creation of the secondary index, and wherein the method further comprises:

storing the index creation restart point in metadata for the table;

in response to receiving a request to update a portion of the table, accessing the metadata to determine that the portion of the table is a previously indexed portion of the table;

in response to determining that the portion of the table is a previously indexed portion:

queuing the update to be performed at the secondary index; and performing the update at the table.

10. The method of claim 5, wherein the maintaining, the evaluating and the resuming are performed by a peer replica of a replica group for the table, wherein the plurality of indexing updates are received from a master replica of the replica group, and wherein the restart event is a master replica failure event, and wherein the method further comprises:

prior to evaluating the plurality of indexing updates, obtaining, by the peer replica, authority to act as a new master replica for the replica group from one or more other peer replicas of the replica group.

11. The method of claim 5, wherein the maintaining, the evaluating, and the resuming are performed by a master replica of a replica group for the table, and wherein the restart event for generating the secondary index is a reboot of the master replica.

12. The method of claim 5, wherein the table is stored in multiple partitions in the data store, wherein the maintaining, the evaluating, and the resuming are performed for one partition of the table.

13. The method of claim 5, wherein the data store is a network-based storage service, wherein the table is maintained for a client of the network-based storage service, and wherein creation of the secondary index is performed in response to a request from the client to create the secondary index for the table.

14. A non-transitory, computer-readable storage medium, storing program instructions that when executed by one or more computing devices cause the one or more computing devices to implement:

during creation of a secondary index for a table stored in a distributed data store that provides an alternative to a primary schema of a primary index for accessing the table, storing a plurality of indexing updates directed to the secondary index that identify respective items from indexed portions of the table to be copied and stored together at the secondary index according to the alternative schema;

upon detecting a restart event for the creation of the secondary index that provides the alternative schema for accessing the table, wherein the restart event is triggered by an error or failure the interrupts the creation of the secondary table:

scanning the respective items of the stored indexing updates to determine an index creation restart point with respect to an order for indexing the table, wherein the index creation restart point is determined such that any remaining portions of the table to be indexed are identified with respect to the index creation restart point; and resuming creation of the secondary index that provides the alternative schema for accessing the table according to the index creation restart point; and indexing the identified remaining portions of the table to provide access to the table via the secondary index having the alternative schema.

15. The non-transitory, computer-readable storage medium of claim 14, wherein the program instructions cause the one or more computing devices to further implement:

generating, by a master replica of the table performing the creation of the secondary index, the plurality of indexing updates; and sending, by the master replica of the table, to one or more peer replicas of the table the plurality of indexing updates.

16. The non-transitory, computer-readable storage medium of claim 15, wherein the maintaining, the evaluating and the resuming are performed by a peer replica of a replica group for the table, wherein the master replica is a member of the replica group, and wherein the restart event is a failure of the master replica.

17. The non-transitory, computer-readable storage medium of claim 14, wherein in scanning the respective items of the stored indexing updates, the program instructions cause the one or more computing devices to implement:

identifying a most recent indexing update in the stored indexing updates; and storing the index creation restart point as a value for the respective item indicated in the most recent indexing update.

18. The non-transitory, computer-readable storage medium of claim 17, wherein the plurality of indexing updates are stored as respective log records in a log.

19. The non-transitory, computer-readable storage medium of claim 14, wherein the program instructions cause the one or more computing devices to further implement:

storing the index creation restart point in metadata for the table;

in response to receiving a request to update a portion of the table, accessing the metadata to determine that the portion of the table is a previously indexed portion of the table;

in response to determining that the portion of the table is a previously indexed portion:
- queuing the update to be performed at the secondary index; and
- performing the update at the table.

20. The non-transitory, computer-readable storage medium of claim 14, wherein the data store is a non-relational database service, wherein the table is maintained for a client of the non-relational database service, and wherein creation of the secondary index is performed in response to a request from the client to create the secondary index for the table.

\* \* \* \* \*